W. H. H. RATHBUN.
FIVE HORSE CULTIVATOR EQUALIZER.
APPLICATION FILED MAR. 27, 1912.
1,100,988.
Patented June 23, 1914.
2 SHEETS—SHEET 1.
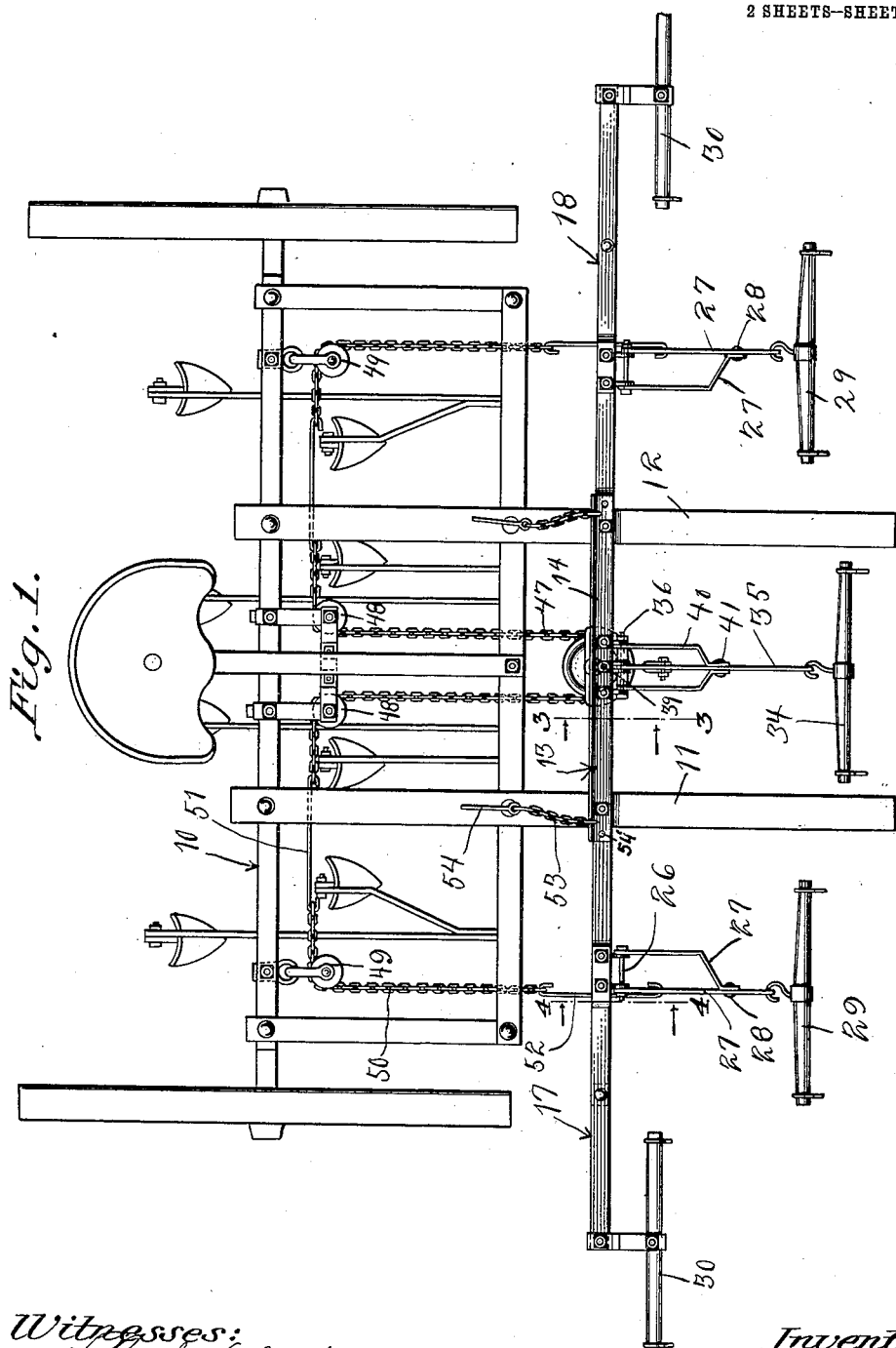

W. H. H. RATHBUN.
FIVE HORSE CULTIVATOR EQUALIZER.
APPLICATION FILED MAR. 27, 1912.
1,100,988.
Patented June 23, 1914.
2 SHEETS—SHEET 2.
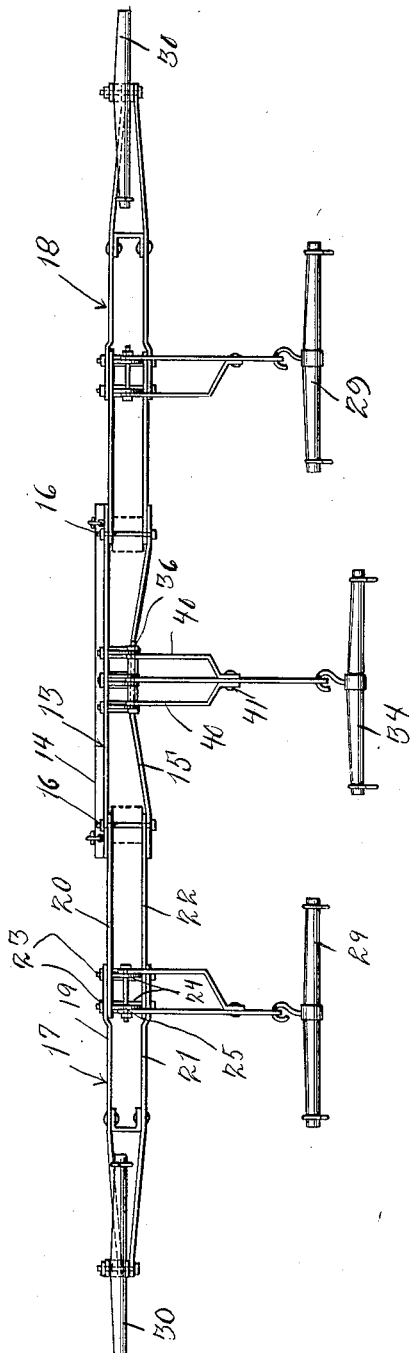
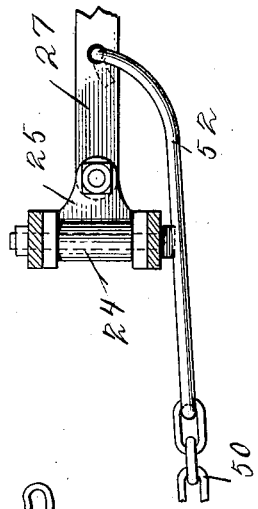
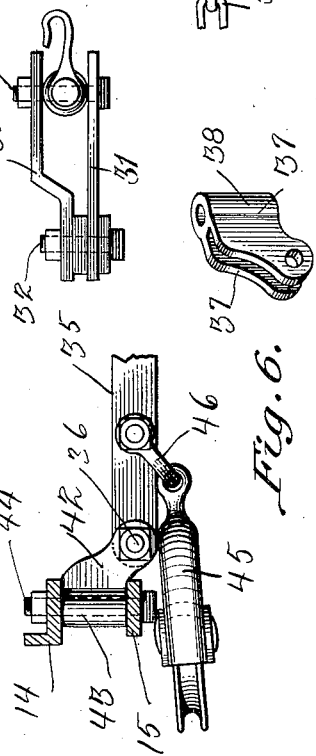
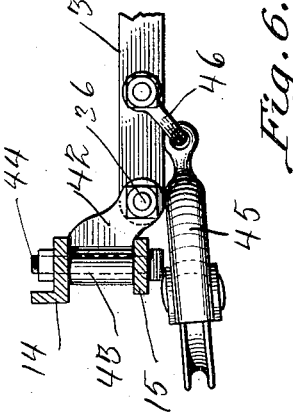
Witnesses:
Lloyd S. Hunter
George B. McCall
Inventor.
Wm. H. H. Rathbun

UNITED STATES PATENT OFFICE.

WILLIAM H. H. RATHBUN, OF GUIDE ROCK, NEBRASKA.

FIVE-HORSE-CULTIVATOR EQUALIZER.

1,100,988. Specification of Letters Patent. Patented June 23, 1914.

Application filed March 27, 1912. Serial No. 686,695.

*To all whom it may concern:*

Be it known that I, WILLIAM H. H. RATHBUN, a citizen of the United States, residing at Guide Rock, in the county of Webster, State of Nebraska, have invented certain new and useful Improvements in Five-Horse-Cultivator Equalizers; and I do hereby declare the following to be a full, clear, and exact description of the invention, such as will enable others skilled in the art to which it appertains to make and use the same.

This invention relates to draft eveners and has for an object to provide an extremely simple and durable device of this character that may be attached to any cultivator having two tongues and will effectively equalize the draft between the draft animals.

A further object is to provide a draft evener that will be formed of a few inexpensive parts and will not easily get out of order.

With the above objects in view the invention consists of certain novel details of construction and combinations of parts hereinafter fully described and claimed, it being understood that various modifications may be made in the minor details of construction within the scope of the appended claims.

In the accompanying drawings illustrating this invention:—Figure 1 is a plan view of the draft evener applied to a cultivator. Fig. 2 is a front elevation of the draft evener. Fig. 3 is a cross section on the line 3—3 Fig. 1. Fig. 4 is a cross section on the line 4—4 Fig. 1. Fig. 5 is a fragmentary end elevation. Fig. 6 is a detail perspective of the central bearing.

Referring now to the drawings in which like characters of reference designate similar parts, 10 designates an ordinary cultivator having two tongues 11 and 12.

The draft evener comprises a central member 13 formed of steel bars 14 and 15 disposed one above the other and bridging the tongues 11 and 12 above and below the tongues, bolts 16 being passed through the tongues and through the bars near the ends of the latter to secure the central member transversely of the tongues. Disposed in alinement with the central member are end members 17 and 18 each formed of a pair of alined upper bars 19 and 20 and a pair of alined lower bars 21 and 22, the bars overlapping and being secured together by bolts 23 upon which spacing tubes 24 are secured, such tubes being equipped with forwardly projecting hinge ears 25. The bars 20 and 22 of each end member are respectively disposed above and below the adjacent tongue of the cultivator and are formed with suitable openings to pivotally receive the above mentioned bolts 16 so that both outer members pivot on these bolts.

Through the hinge ears 25 of both spacing tubes 24 of each end member is passed a pivot bolt 26 and to the ends of this bolt are secured draft bars 27 that are rigidly connected together by a rivet 28 or otherwise one of the draft rods extending forwardly and beyond this rivet and being equipped with a swingle tree 29.

Each end member is terminally equipped with a swingle tree 30, and to attain this end a pair of draft bars 31 are secured to the ends of the bars 19 and 21 of the end member by means of a bolt 32, the swingle tree being inserted between the extremities of the bars 31 and pivotally secured thereto by means of a pivot bolt 33. The bars 31 are of less length than the above mentioned bars 27 so that the draft animals attached to the swingle trees 30 at the extreme ends of the draft evener are positioned nearer to the draft evener than the draft animals attached to the swingle trees 29.

A swingle tree 34 is secured between the tongues 11 and 12 slightly in advance of the swingle trees 29 by means of a central draft bar 35 which is secured by means of a bolt 36 between hinge ears 37 of a tubular bearing 38 that is secured between the upper and lower bars 14 and 15 of the central member by means of a bolt 39. Brace bars 40 are secured at the forward ends to the draft bar 35 by means of a rivet 41 or otherwise and are secured at the rear ends to the above mentioned bolt 36 the ends of which are secured to hinge bars 42 which project from tubular bearings 43 that are secured between upper and lower bars of the central member by means of bolts 44.

It will be noted that the central swingle tree 34 and also both intermediate swingle trees 29 are hinged at their rear ends and swing in vertical planes as best shown in Fig. 2, while the terminal swingle trees 30 are rigidly secured to the extreme ends of the draft evener.

A sheave 45 is secured to the central draft bar 35 by means of a clevis 46 and the central bight of a chain 47 is trained over this sheave, the chain extending rearwardly toward the cultivator axle and having the ends trained in opposite directions over sheaves 48 that are secured to the cultivator axle on opposite sides of the longitudinal central axis of the cultivator. There are sheaves 49 secured to the axle in rear of the intermediate swingle trees 29, and over these sheaves are trained chains 50, the rear end of each chain being connected to the adjacent end of the chain 47 by means of a removable link 51, and the forward end being connected to the related draft bar 27 by means of a removable link 52.

The chains above described and arranged in the above described manner equalize the pull of the two draft animals attached to the swingle trees 30 and 29 of each end member of the draft evener. To lock the central member in horizontal alinement with the end members which are pivoted thereto, and thus render the draft operating means inoperative, pins 54 are provided which are adapted to be passed through alining openings 54' in the ends of the central member and of the end members. To hold the pin when it is not in use a flexible connection 53 is secured to one end thereof and secured to the ends of the upper bore 14 of the central bore.

A draft evener constructed as above described will equalize draft between five draft animals or between any number of draft animals from two to five. Furthermore, this draft evener is formed of a few strong and durable parts which will not easily get out of order and which may be manufactured at a minimum expense and which may be applied to all cultivators now in general use that are equipped with two tongues.

What is claimed, is:—

1. A draft evener including a central bar member, terminal bar members pivoted at the inner ends to the outer ends of said central member, alined swingle trees carried at the outer ends of said terminal members, a central swingle tree carried by said central member, intermediate alined swingle trees on said terminal members disposed in advance of said terminal swingle trees and in rear of said central swingle tree, and an evener chain terminally connected to said terminal member and centrally loosely connected to said central member.

2. The combination with spaced draft tongues, of a draft evener including a central bar member spanning said tongues, terminal bar members pivoted at the inner ends to the ends of said central member and disposed in alinement with said central member and outside of said tongues, alined swingle trees carried at the extreme outer ends of said terminal members, a central swingle tree carried by said central member between said tongues, alined swingle trees disposed on said terminal members outside of said tongues and arranged in advance of said terminal swingle trees and in rear of said central swingle trees, and an evener chain terminally connected to said terminal member and centrally loosely connected to said central member.

WM. H. H. RATHBUN.

Witnesses:
   Lloyd H. Hunter,
   H. C. Clabaugh.

---

Copies of this patent may be obtained for five cents each, by addressing the "Commissioner of Patents, Washington, D. C."